United States Patent [19]

Cummins

[11] Patent Number: 4,960,601
[45] Date of Patent: Oct. 2, 1990

[54] METHOD FOR PUMPING, HOMOGENIZING AND DIVIDING DOUGH AND THE LIKE

[75] Inventor: Donald L. Cummins, Mechanicsville, Va.

[73] Assignee: AMF Machinery Systems, Inc., Richmond, Va.

[21] Appl. No.: 367,616

[22] Filed: Jun. 19, 1989

[51] Int. Cl.$^5$ .............................................. A21D 6/00
[52] U.S. Cl. ...................................... 426/504; 366/85; 425/204; 426/519
[58] Field of Search ............... 426/496, 503, 504, 519; 425/204, 208; 366/85, 86, 323

[56] References Cited

U.S. PATENT DOCUMENTS

| | | | |
|---|---|---|---|
| 2,231,357 | 2/1941 | Burghauser et al. | 366/85 |
| 2,615,199 | 10/1952 | Fuller | 425/204 |
| 3,060,512 | 10/1962 | Martin et al. | 425/204 |
| 3,203,370 | 8/1965 | Haug et al. | 366/85 |
| 3,225,715 | 12/1965 | Page | 425/204 |
| 3,719,350 | 3/1973 | Loomans | 366/85 |
| 3,917,507 | 11/1975 | Skidmore | 425/204 |
| 4,043,002 | 8/1977 | Brackman | 425/204 |
| 4,147,809 | 4/1979 | Thompson | 426/503 |
| 4,192,617 | 3/1980 | Spielhoff | 425/204 |
| 4,332,538 | 6/1982 | Campbell | 425/140 |
| 4,424,236 | 1/1984 | Campbell | 426/503 |
| 4,449,908 | 5/1984 | Campbell | 425/204 |
| 4,517,212 | 5/1985 | Campbell | 426/496 |
| 4,599,002 | 7/1986 | Gutknecht | 366/85 |
| 4,643,661 | 2/1987 | Chszaniecke | 425/204 |

Primary Examiner—George Yeung
Attorney, Agent, or Firm—Staas & Halsey

[57] ABSTRACT

An apparatus and method for continuously dispensing dough for making bread, rolls, buns and the like by pressurizing and homogenizing the dough by a pair of open-flighted augers in a tunnel having minimal clearances so that the dough is provided with a uniform texture and density which permits a division into pieces having weights with tolerances within one-half of one percent.

11 Claims, 2 Drawing Sheets

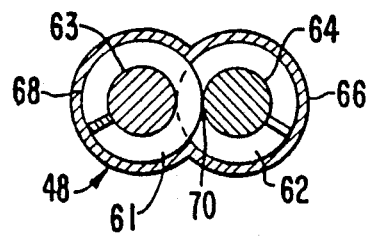
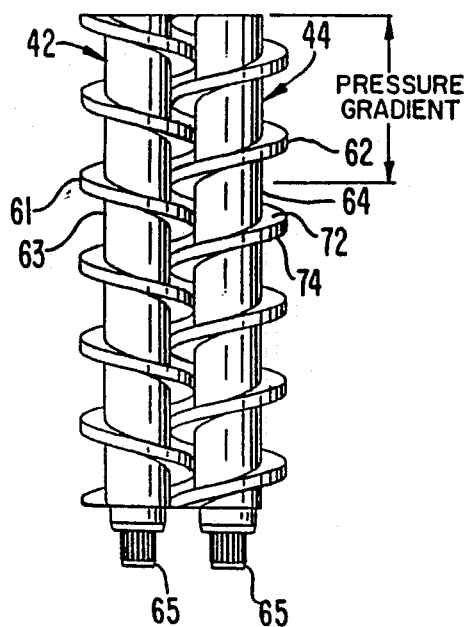
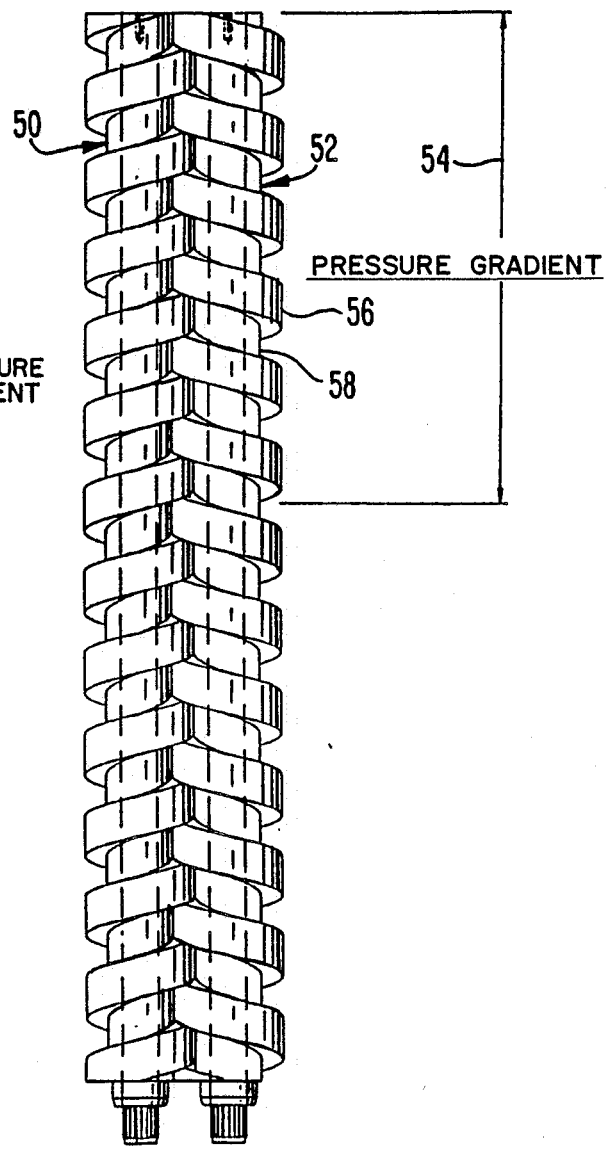

METHOD FOR PUMPING, HOMOGENIZING AND DIVIDING DOUGH AND THE LIKE

This invention relates to an apparatus and method for pumping and homogenizing dough used for baking breads, buns, rolls and the like and for division of said homogenized dough into predetermined weights of uniform density and texture for baking into bread loaves, buns, rolls and the like.

The apparatus and method may also be used for other materials that are similar to dough in their characteristics. The invention is an improvement on the apparatus and methods disclosed in U.S. Pat. Nos. 4,332,538, 4,424,236, 4,449,908 and 4,517,212 which are referred to herein and incorporated by reference. These prior patents show a double auger type of dough pump and divider which takes dough in bulk form and pumps it through an extruder or dispensing nozzle where it is cut into uniform pieces by a rotating cutter moving across the dispensing nozzle.

In the previous patents and with specific reference to FIG. 3 and column 4, lines 16-26 of U.S. Pat. No. 4,449,908, the screw elements 29 and 30, especially in the critical area of phase D located in a discharge conduit 14, are "ACME screws and have both their conveying services 33B and following services 34B formed at right angles with respect to shaft 36 and the space 37 between the threads 31 of each screw element and the thickness of each thread 31 are substantially equal so that the interference fit made between the thread of one screw element is snug in the space between the thread of the other element. The screws in phase D form isolated conveying pockets so as to maintain the dough in the moving pockets and positively convey the dough."

The present invention is an improvement on the double augers that the arrangement could be substantially improved upon to provide uniformly weighted dough pieces without degrading the dough or causing a swirl pattern to appear in the baked off bread or rolls.

In the present invention, the helixes or flights of the helical screws or augers are dimensioned so as to provide a substantial open linear space between the flights instead of an interference fit. The augers are driven at a speed that provides a substantial slippage in the dough being conveyed in the dispensing conduit or pressurizing tunnel which is substantially shorter than that heretofore used. The result of the substantial slippage and open flights in the pressurizing tunnel where there is minimal clearance between the flights and the walls of the tunnel produces a dough that is substantially homogenized and of uniform texture and density. Because the prior augers were so efficient due to the interference fit of the helical screws, any substantial homogenizing effect on the dough was precluded.

Dough is subject to a non-uniform gassing arising as a result of yeast and results in a non-uniform density. This non-uniform density translates into a lessened uniformity of scaled weights of dough pieces when they are cut-off from the stream of moving dough. It is very important that each dough piece be as equal in weight to each other as possible as this improves the quality and ability to automatically handle and package the products. Also, the weight of the dough is one of the most expensive cost elements in manufacturing baked goods in quantity and control of the weight tolerances can reduce the need for excess dough. This weighing of the individual dough pieces is known as scaling in the trade.

Heretofore, a 2½% deviation in weigh from the predetermined desired was a normal variation. With the new invention, this has been reduced to ½%, a five to one improvement.

Accurately weighted dough pieces could be achieved with the old apparatus by operating at extreme high pressures to homogenize the dough in the close running clearances between the augers and the conduit in which they operated. An attempt was made to reduce the pressures by increasing the clearance between the augers and the conduits in which they were housed but this increased shear reduced the integrity in the dough and produced unacceptable characteristics in the finished product. At the high pressures required to bring about accurately scaled weights in the old apparatus, the dough was greatly degraded due to shear and the effects of a long pressure gradient represented by the length of the conduit which the augers operated. This general degrading by high pressure including localized degradation at the periphery of the augers, was apparent in the finished product in the form of swirl patterns and non-uniformity of texture along with discoloration and circular stratiform.

The present invention obviates the previous problems and provides a dough that has been homogenized to equal density without being degraded. This is accomplished by the use of two juxtaposed augers having helical flights with the flights of one auger inserted into the spaces between the flights of the other auger such that there is minimal clearance between the flight of one auger and the shaft of the adjacent auger and the thickness of the flight's web is less than about one fourth or 25% of the pitch of the auger. In the preferred embodiment, the actual thickness of the web of the flight is ⅜th of an inch and the pitch is four inches with the outside diameter being 5.8 inches. The pair of augers are surrounded by pressuring tunnel with minimum clearance between the flights and the inside of the tunnel.

The augers are driven at a speed where substantial slippage occurs and there is a substantial homogenizing of the dough as it is pressurized. The pressure applied to the dough is a function of the speed or rotation of the augers measured in revolution per minute of RPMs. The pressurizing tunnel is quite short as compared to the previous apparatus. It being 9 inches long as opposed to 24 inches long and the pressures are substantially less on being their order of 15 to 85 pounds per square inch (psi) whereas the previous pressures were on the order of 60 to 110 psi. Also, there is substantially no shearing action between the augers because of the minimal clearance between the flights of one auger and the shaft of the adjacent auger and the minimal clearance between the outside diameter of the flights and the confining pressure rising tunnel. Thus, the three main causes for degradation of dough, i.e., high pressure, time under pressure and shearing are either eliminated as a practical matter or substantially reduced so there is minimal degradation in the handling of the dough.

One of the most important factors in the invention is a uniformity of the density of the product. After the dough has been mixed together with the proper ingredients including yeast, the carbon dioxide starts providing small pockets of gas in the dough and causing it to rise. The problem in obtaining uniformity is created by the fact that the gassing is a nonuniform process so a given volume of a given dough will not weigh the same. The nature of the present invention is such as to homogenize the dough so the gas is distributed in a uniform manner throughout the dough as it is rising so that the extruded dough product has a uniform density. This permits very accurate scaling as the product is periodically and automatically cut into equal volumes. Uniformity of weight between pieces in the order of one half of 1 percent variation can be achieved. This is excellent and is five times better than that of some of the previous processes.

The features and advantages of the present invention will become more apparent upon reading the following specification, when taken in conjunction with the accompanying drawings in which:

FIG. 2 is a cross-sectional view of the augers of FIG. 1 and the pressurizing tunnel;

FIG. 3 is a view of the augers of the present invention and how they relate one to the other; and FIG. 4 shows the augers of the prior art.

Figure 1:
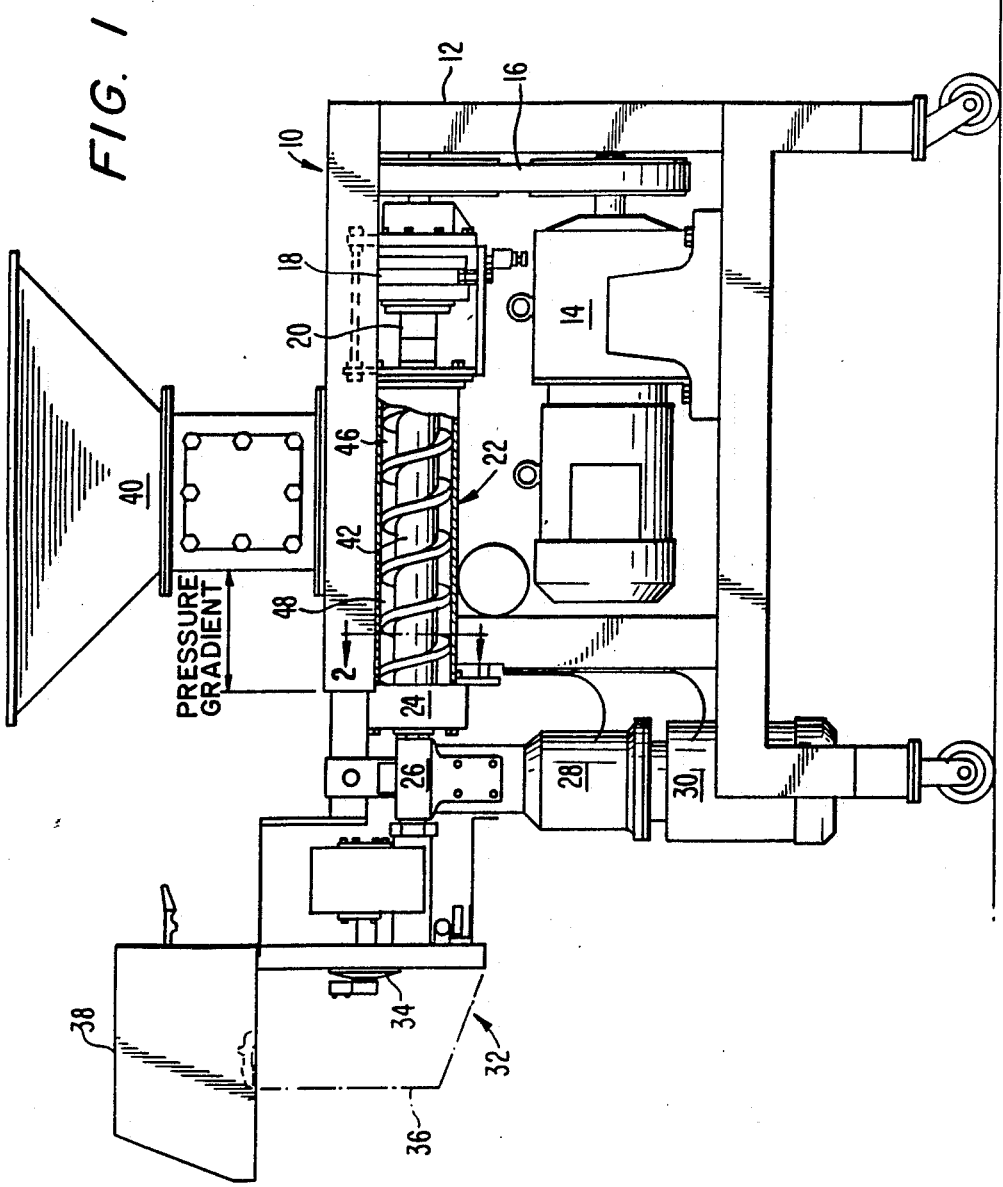
FIG. 1 is a side view of the overall apparatus with a part broken away to show one of the augers.

Referring now in more detail to the drawings, there is shown in FIG. 1 a side view of a preferred embodiment of the apparatus of the present invention. FIG. 1 shows the dough pump extruder 10 having a frame 12, an auger drive motor 14 connected by an auger drive belt 16 to an auger drive gear box 18. The auger drive motor 14 is a readily available variable speed type with the speed varied by means of an adjustable frequency control (not shown). The control is preferably driven by the feedback of the pressure measured by a pressure transducer (not shown) of the dough prior to it being dispensed. The pressure transducer and adjustable frequency control are well known to those skilled in the art.

The output from the auger drive gear box 18 is connected by an auger drive coupler 20 to the drive ends of augers 42 and 44 located in the auger section 22. The augers are driven to rotate from 92 to 280 RPMs when making bread and 50 to 120 RPMs when making small pieces for buns, rolls and the like. Preferably premixed dough is fed continuously into hopper section 40. At the bottom of the hopper section 40 there is an auger hopper trough input section 46 similar to that shown in FIG. 4 of U.S. Pat. No. 4,449,908. The bottom of the dough mass in the hopper section is removed by the auger or feed screws 42 and 44 and conveyed to the left into the auger tunnel pressurizing section or chamber 48 having a discharge end which dispenses the dough into a transition-to-metering block 24. From the metering block the dough passes into a metering pump 26 driven by a metering pump motor 30 through a metering pump gear box 28. The metering pump is primarily for setting the scaling weight.

At a given revolution per minute of the augers, dough of uniform density and uniform velocity will pass through it. It is most important that the dough be homogenized by having the gases uniformly dispersed and/or removed from the dough adequately to achieve good scaling. This is accomplished by the homogenizing action that takes place in the auger tunnel pressurizing section or chamber 48.

From the metering pump 26, the dough is extruded into the cut-off section 32 on a continuous basis where cut-off knife 34 cuts pieces from the continuously extruded dough of a uniform size. The cutting action is periodic and typically 75 to 150 cuts per minute for pieces for loaves of bread of 19 ounces.

After the pieces are cut from the continuously extruded dough, they fall or are pushed onto a conveyor (not shown).

The cut-off section 32 has a cut-off safety cover shown in the safe and lowered position 36 and then the open and raised position 38.

The auger drive, metering pump drive and cut-off drive all are under adjustable frequency control operating from 30 Hertz to 90 Hertz. The motors are basic three phase induction type motors with totally enclosed housings and normally run at 1750 RPMs at 60 Hertz. By varying the frequency from 30 to 90 Hertz, the speed of the primary components of the apparatus are varied accordingly.

The apparatus uses a vacuum to draw the dough down into the hopper and pull off gas that separates from the dough as the augers move the dough, this is not shown but is a type shown in the earlier patents.

With reference to FIGS. 2 and 3, the augers of the invention are shown in FIG. 3 with the left auger 42 and right auger 44 being identical except the helical flights 61 and 62 being oppositely threaded and adopted to be rotated in opposite directions. Each auger or feed screw 42 and 44 has a core or shaft 63 and 64 respectively and the shaft is adapted to be driven at end 65 through the auger drive coupler 20. As shown in FIG. 3, the augers or feed screws 42 and 44 have a conveying or leading surface 72 and a trailing or following surface 74. The augers are made from a high density polyethylene plastic referred to as UHMW or ultrahigh molecular weight plastic. This material has an excellent compatibility with the dough and the apparatus does not need lubricating with mineral oil except at the very beginning which wipes off with the first dough. By not applying mineral oil as a lubricant, the subsequent handling of the dough and uniform browning thereof during the baking process is enhanced.

The dimensions of the augers in the preferred embodiment are a four inch pitch for the flights with the thickness of the web of each flight being ⅜ inches. The outside diameter is 5.8 inches. The auger is divided into a pressurizing or extension part and the part in the trough under the hopper for conveying the dough into the pressurizing tunnel. The part of the auger that rotates in the auger tunnel pressurizing section or chamber 48 is 9 inches long which is about 2¼ threads in the tunnel. The total auger is 24 inches long. The dimensions of the auger may be different under the hopper and in the tunnel. The relative dimensional relationship of that part of the auger in the tunnel is critical as to the clearances and openness of the flights and their longitudinal spacing between the interposed flights. The number of threads in the tunnel should be no greater than 4½ but preferably are approximately 2¼. Because of the confining nature of the tunnel, this is the only part of the dough in which any substantial pressures are built up by the augers. Because of the open nature of the flights, there is substantial slippage and so the augers must be rotated at a higher speed sufficiently to reach the desired pressures. This slippage causes a substantial homogenization action to take place which spreads the pockets of gas in the dough so that they are uniformly dispersed and the dough is of uniform density.

As is seen in FIG. 3, the preferred dimensions are such that the ⅜ inch thick web of the flight on a four inch pitch leaves a space of 3 and ⅝ inch from one flight to the next. In this space is the flight of the adjacent parallel auger which also has a ⅜ inch thick web for its flight. The dough is confined in the pressurizing tunnel to move along the spaces between the outside diameter of the flight and the shaft of the augers. This is better seen with reference to FIG. 2 which is a cross-sectional view of the augers inside the auger tunnel pressurizing section or chamber 48. The tunnel is made of stainless steel and as seen closely confines the outside dimensions of the two augers with the clearance between the housing for the tunnel 66 and the outside diameter of the augers at 68 being a minimal clearance that still permits the augers to freely turn. This is in a neighborhood of 0.050 inches and must be designed to accommodate the expansion of the plastic augers as they heat up and expand when they are used. A similar minimal clearance is present between the outside diameter of the flights of the augers and the shaft of the adjacent auger such as shown at 70.

With reference to FIG. 4, there is shown the old augers which had a 24 inch pressure gradient and space between the flights only sufficient to accommodate the thickness of the flight of the adjacent auger. The new and old augers have substantially the same outside diameters, shaft diameters and pitch.

The augers move the dough from the lower part of the hopper to the inlet of the metering pump and also condition and homogenize the dough to a uniform density so when the dough is extruded each piece will weigh the same when cut-off at the uniform rate. The augers and the pressurizing tunnel act much like a gentle blender since the tunnel is short and the augers open flighted with just enough clearance in the tunnel to run.

The dough moves continuously through the tunnel and is not subject to shearing action along the outer edges of the augers. Being open flighted, that is, with a large space between the interposed helical flights, slippage occurs through the core section of the auger that blends and homogenizes the dough. Some degassing occurs and the remaining gases blend in homogeneously into the dough bringing it to uniform density.

Having such uniform density is the only way accurate scaling can occur in an extrusion type divider. Each dough product has a minimum pressure and revolutions per minute of the auger required to homogenize it to a uniform density for accurate scaling. This pressure is established through the RPMs so that an increase in RPMs increases the pressure, slip and blending. The minimum scaling pressure and RPM is that minimum setting require to bring the dough to the uniform density needed for accurate scaling. Approximately 2° F. temperature arise will occur on a typical bread dough after all components in a production run have had time to warm up.

Minimum scaling pressure represents the least amount of influence on the dough possible and still get good scaling. It is the least amount of temperature arise possible as well.

The short open flighted augers of the apparatus allow optionally more non-destructive work in the form of heat to be added to the dough. This is because the slip of the short open flighted auger in the tunnel inflicts very little shear on the dough. It is possible in many cases to put from 6° to 9° F. of heat into the dough by increasing the pressure and therefore the RPMs of the augers and still get an acceptable product with little or no change of formulation. This additional heat may be added in appropriate cases. One of these cases is to obtain a finer and more uniform texture in a finished product which may be achievable with additional pressure and RPMs. Another case is when a short intermediate proof is being utilized or is desired as a warmer more pliable dough piece sheets down better at the panning section. A third case is that the mix time may be modified in exchange for additional work being added to the dough at the divider.

It is to be noted that in the embodiment shown as illustrative of the invention only a single extrusion or dispensing indicated. This would be the situation in the case of large pieces for loaves of bread and the like. In the case of smaller pieces such as buns and rolls, the flow of dough emerging from the discharging end of said apparatus may be subdivided into a plurality of parallel streams with the pieces being simultaneously cut-off, periodically by the cut-off knife.

It will be understood that the foregoing relates only to one preferred embodiment of the present invention. Numerous changes and modifications may be made therein without departing from the spirit and scope of the invention as set forth in the following claims.

What is claimed is:

1. A method of pumping and homogenizing material similar to dough to a uniform density and texture from the lower portion of a mass of said material comprising the steps of:

moving the material from the lower portion of the mass of said material with a pair of open-flighted augers each with a helical flight and haft with said flight positioned about said shaft with the flight of the first of said augers projecting and interposed into the space formed by the flight of the second of said augers with substantial longitudinal clearance between adjacent interposed flights of one auger and the interposed flights of the adjacent auger;

moving the material by said augers along a path through a trough and into a pressurizing tunnel where the clearance between said tunnel and said pair of augers is minimal and the clearance between the flights of one auger in the tunnel and the shaft of the adjacent auger in the tunnel is minimal;

homogenizing and pressurizing said material in said tunnel by rotating said augers at sufficient speed to cause a slippage between said flights and said material to impart a pressure and uniform density and texture thereto; and dispensing said uniform material from said tunnel.

2. The method of claim 1, wherein said material is dough.

3. The method of claim 2 wherein said open-flighted augers in said pressurizing tunnel have flights whose thickness is less than one fourth the pitch of said flights.

4. The method of claim 2, wherein said open-flighted augers in said pressurizing tunnel have flights whose thickness is approximately 15% of the pitch of said flights.

5. The method of claim 2, which includes the step of periodically severing said dough into pieces of uniform weight and texture after being dispensed from said tunnel.

6. The method of claim 2, wherein said augers have no greater than four and one-half threads in said pressurizing tunnel.

7. The method of claim 2, wherein said augers have approximately two threads in said pressurizing tunnel.

8. The method of claim 2, wherein said augers rotating in said tunnel generate a pressure of 15 to 85 pounds per square inch on said dough and the like.

9. The method of claim 2, wherein said augers are made of plastic and said tunnel is made of stainless steel and one of said augers can rotate in the other without needing an oil as a lubricant whereby the dough can be baked with a more uniform browning.

10. The method of claim 9, wherein said plastic augers are made of ultrahigh molecular density polyethylene.

11. The method of claim 9, wherein said rotation of said augers in said pressurizing tunnel raise the temperature of the dough at least two degrees Fahrenheit.

* * * * *